United States Patent [19]

Crow

[11] 4,242,581

[45] Dec. 30, 1980

[54] LASER ENERGY MONITOR

[75] Inventor: Thomas G. Crow, Longwood, Fla.

[73] Assignee: The United States of America as represented by the Secretary of the Army, Washington, D.C.

[21] Appl. No.: 16,703

[22] Filed: Mar. 1, 1979

[51] Int. Cl.³ .................................................. G02B 5/14
[52] U.S. Cl. ..................................... 250/227; 356/222
[58] Field of Search ............... 356/222, 225; 250/209, 250/227, 578; 350/96.1, 96.2

[56] References Cited

U.S. PATENT DOCUMENTS

| | | | |
|---|---|---|---|
| 4,081,672 | 3/1978 | Caspers et al. | 250/227 |
| 4,150,285 | 4/1979 | Brienza et al. | 250/227 |
| 4,157,477 | 6/1979 | Kall et al. | 250/227 |

*Primary Examiner*—David C. Nelms

*Attorney, Agent, or Firm*—Nathan Edelberg; Jeremiah G. Murray; Bernard Franz

[57] ABSTRACT

A sensor head for monitoring radiated laser energy is disclosed which utilizes a transparent scatter plate placed in the path of the laser beam. A plurality of regularly spaced photodetector diodes are secured to its outer edge. The scatter plate and photodiode configuration are contained in a mounting bracket and frame assembly which permits its attachment to a front of a variety of laser systems without requiring modification of those systems. As radiation from the incident laser beam is transmitted through the plate, a small portion of the laser energy is coupled to the diodes via microscopic scattering sites in the plate. The signal output from the four diodes is combined by signal summing to provide a measure of the energy at peak power output of the laser without distorting or perturbing transmitted beam.

10 Claims, 6 Drawing Figures

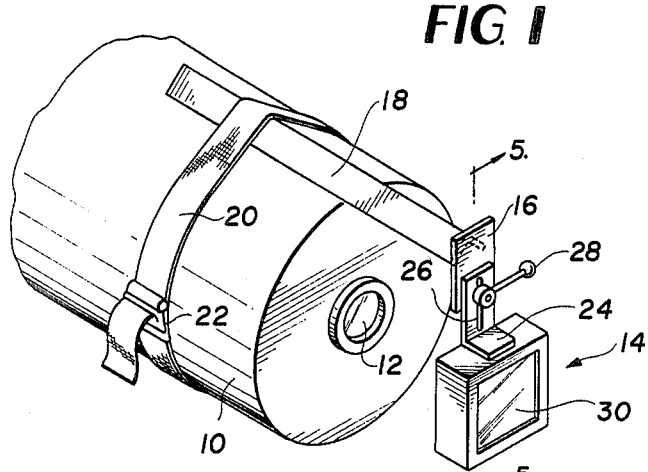
FIG. 1
FIG. 2
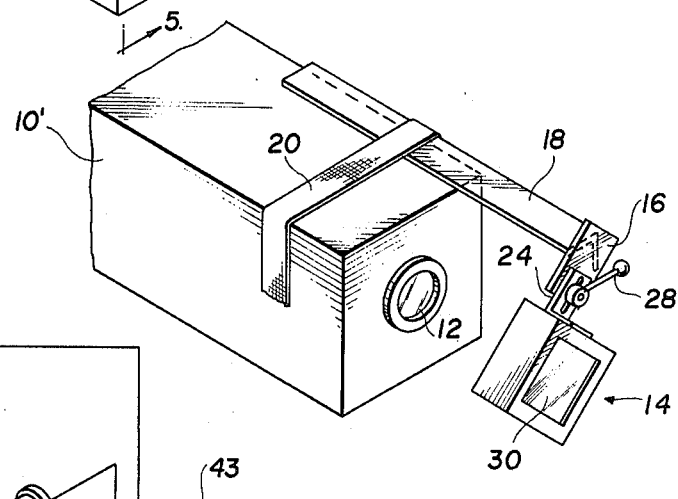
FIG. 3
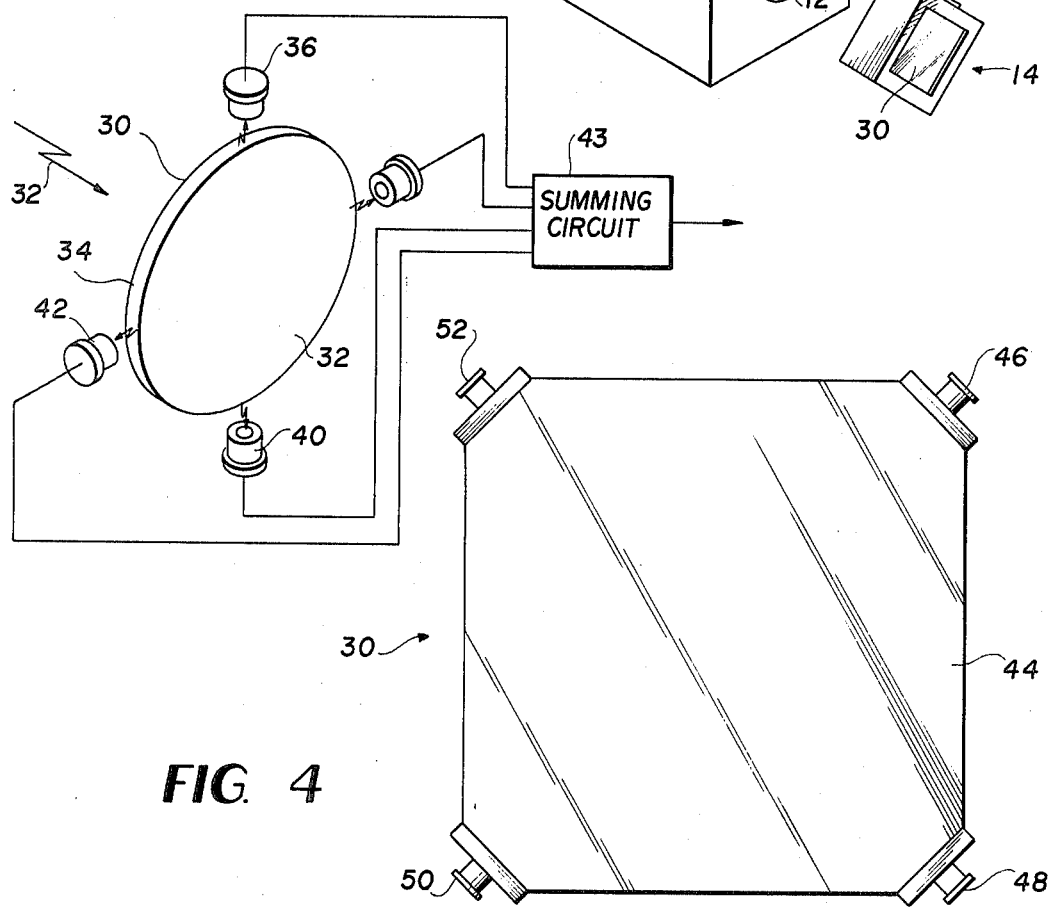
FIG. 4

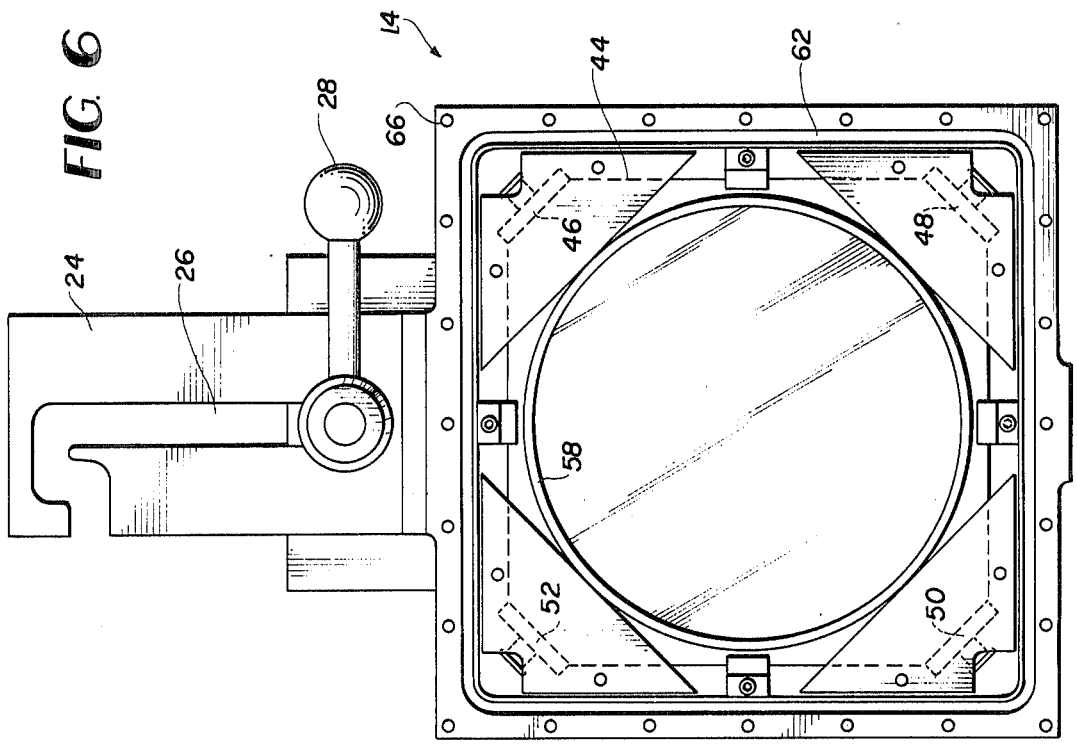
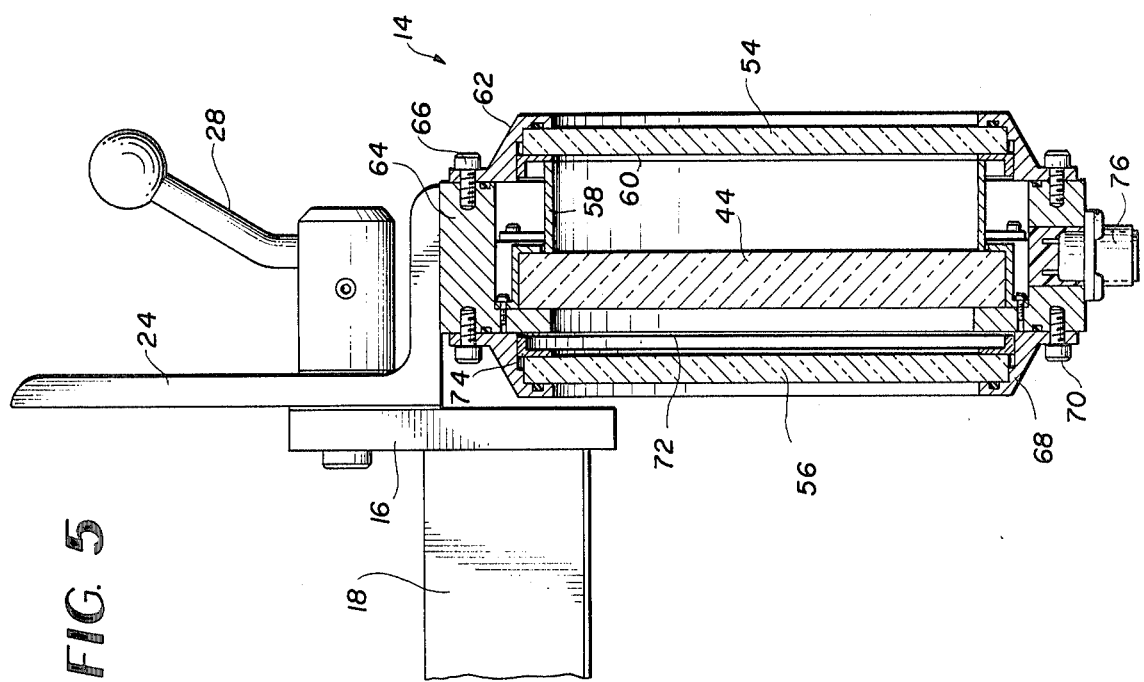

LASER ENERGY MONITOR

The invention described herein may be manufactured and used by or for the Government for governmental purposes without the payment of any royalties thereon or therefor.

BACKGROUND OF THE INVENTION

This invention relates generally to a radiant energy measurement device and more particularly to a means for providing an indication of the radiated energy output of a laser.

While systems and devices are known for measuring the energy output of laser systems, such systems often have hot spots in the near field pattern which have a tendency to change with time. Accordingly, an energy monitor which samples but a small portion of the laser near field normally will experience larger fluxations in incident energy on a shot-to-shot basis than an energy monitor which senses several portions of the near field or of the total beam cross section.

It is an object of the present invention, therefore, to provide a new and improved means for measuring laser energy.

It is another object of the present invention to provide a new and improved laser energy monitor which is adapted to provide a representative indication of the energy contained in the total beam cross section.

It is still another object of the present invention to provide a ruggedized laser energy monitor that can be easily calibrated under field conditions involving the variable ambient temperatures and other changeable operating conditions.

SUMMARY

Briefly, the subject invention comprises a device for measuring the energy in the output of a large aperture laser without distorting or perturbing the transmitted beam and comprises a flat plate of optically transparent material such as quartz or glass having anti-reflection coated surfaces. A plurality of photodetectors are arranged in a regular pattern around the edge of the plate with the elements being mounted in a frame which is adapted to place the plate in a plane normal to the transmitted beam of a laser. The photodetectors accordingly are located in a plane normal to the transmitted beam and respectively monitor scattered laser light from inclusions and scatter sites in the plate. Direct energy from the laser beam is not monitored. The scattered energy appearing around the periphery of the monitoring plate is adapted to offset spatial variations of energy in a relatively large diameter beam and thus a summing of the energy as detected by the photodetectors is adapted to provide an indication which when calibrated provides a measurement of the incident laser energy.

BRIEF DESCRIPTION OF THE DRAWINGS

FIGS. 1 and 2 illustrate means for attaching the subject invention to two different types of laser housings;

FIG. 3 is intended to schematically illustrate the preferred embodiment of the subject invention;

FIG. 4 is a front plan view of a generally rectangular scatter plate having four photodiodes attached to its corners;

FIG. 5 is a side planar view partially in section of the preferred embodiment of the subject invention utilizing the scatter plate arrangement shown in FIG. 4; and FIG. 6 is a front planar view being illustrative of the preferred embodiment of the invention shown in FIG. 5.

DESCRIPTION OF THE PREFERRED EMBODIMENTS

Referring now to the drawings wherein like numerals refer to like parts throughout, reference is now made to FIGS. 1 and 2. Accordingly, reference numerals 10 and 10' respectively designate generally circular and rectangular laser housings each having a circular aperture 12 at one end for externally radiating a laser beam, not shown, therefrom. A sensor head assembly 14 generally illustrative of the present invention is slidably attached to a bracket 16 which is secured to one end of an elongated bar 18 which is adapted to be held in position on the outer surface of the housings 10 and 10' by a strap 20 including a buckle 22. The assembly 14 is attached to a small angle bracket 24 having a slot 26 which engages a quick release lever lock sub-assembly 28. Manual operation of the lever lock assembly 28 permits the sensor head assembly 14 to be axially positioned relative to the aperture 12. Thus positioned, a scatter plate 30 included in the sensor head assembly is located in a plane normal to the transmitted beam which exits the aperture 12.

Referring now to FIG. 3 in its simplest form, the scatter plate 30 is comprised of a flat piece of transparent plate glass or quartz through which a laser beam 32 is directed. Such a plate typically has a 10 cm. clear aperture and is approximately 2 cm. in thickness. The flat plate 30 includes anti-reflection coated surfaces so as to introduce no discernable distortion to the laser beam; however, a small portion of the transmitted laser energy typically 0.3 to 0.6% of the incident radiation is scattered by the microscopic scattering sites present in even the best optical glass. These scattering sites in effect constitute localized sampling points of the laser output which are distributed uniformly over the beam cross section. This energy scattering, moreover, is detected at the outer edge 34 of the plate by means of a plurality of photo detectors selectively positioned at regular intervals around the edge. In the arrangement shown in FIG. 3, four photodiodes, typically silicon avalanche diodes 36, 38, 40 and 42 are located adjacent the edges 34, being spaced at 90° intervals around the periphery. The four detectors thus symmetrically located allow for the inhomogeneity of the laser near field energy and are thus adapted to sense the integrated scatter from all scatter sites, which when summed for example in a summing circuit 43 provide an indication of the energy contained in the total beam cross section. What is significant about the scatter plate type of monitor is that each scatter site is sufficiently small that no significant perturbations of the transmitted beam is introduced. While other types of scattering devices may be employed, the transparent plate is preferred. For example, when desired a fine wire mesh may be utilized to introduce scattering while permitting efficient transmission of the laser beam. However, the difficulty with a wire mesh is that the back scatter from the wires is strongest on axis and the photodetectors must be placed such that each detector can view the entire screen aperture. The result of this problem is that the wire screen and detector arrangement cannot be as compact as a glass plate-detector configuration inasmuch as the detectors cannot be used in a plane normal to the transmitted laser beam. Also, the forward scatter from the screen is more pronounced than that from the scatter plate. In some applications the additional off axis radiation will present a detrimental problem which is not desirable.

FIGS. 4, 5 and 6 are intended to more fully illustrate the mechanical details of the preferred embodiment of a scatter plate-photodiode assembly.

Reference to FIG. 4 simply shows that the scatter plate is comprised of a generally square rectangularly shaped member 44 having truncated corners to which are attached two pairs of oppositely disposed photodetector diodes 46, 48, 50 and 52 which may be, for example, silicon avalanche diodes. This configuration is located as shown in FIGS. 5 and 6 in a generally rectangular assembly which was referred to above in FIGS. 1 and 2 by reference numeral 14. While not essential to its operation, the scatter plate 44 as shown in FIG. 4 is mounted between front and rear windows 54 and 56 as shown in FIG. 5. A ring-type spacer 58 separates scatter plate 44 from the front window 54. The front window 54 in turn is held in position by means of a locking ring 60 and cover 62 which is fastened to a square shaped base member 64 by means of a plurality of screw bolts 66. The rear window 56 is held in position by means of a rear cover member 68 which is fastened to the base member 64 by means of a plurality of screw bolts 70. Additionally, a locking ring and spacer member 74 are included intermediate the scatter plate and rear window 56.

FIG. 5 additionally discloses an electrical connector 76 which is fitted to the base member 64 for feeding electrical signals from the diodes 46 through 50 to external utilization means such as a processor which is adapted to average the output of the summed diodes which together with the average laser pulse rate, is compared with a calibration reference to measure not only the energy, but the peak power output of a relatively large aperture laser without distorting or perturbing the transmitted beam.

Thus what has been shown and described is a simple and reliable laser energy monitor which is particularly useful for but not restricted to military applications. While the present invention has been shown and described with a certain degree of particularity, it should be noted that the present disclosure has been made by way of example and not by limitation and accordingly, all alterations, modifications coming within the spirit and scope of the present invention are herein meant to be included.

I claim as my invention:

1. A sensor head assembly for monitoring the optical energy in a laser beam, comprising, in combination:
   optical energy scatter means located in the path of said laser beam and in a plane substantially normal thereto, said scatter means having substantially uniformly distributed scattering sites for scattering a relatively small portion of the incident energy in said laser beam while introducing substantially no distortion thereto;
   a plurality of photodetector elements selectively located around the periphery of said scattering means to sense integrated scattered energy from said scattering sites to offset spatial variations of energy in said laser beam and generate respective electrical signals in accordance with the energy sensed thereby; wherein said scatter means comprises a scatter plate having front and rear planar faces located in said plane normal to said laser beam, said scatter plate including anti-reflective surfaces and a peripheral edge around which is located said plurality of photodetector elements; and
   output means coupled to said plurality of photodetector elements for providing a composite output signal representative of the energy contained in the cross section of said output beam.

2. The sensor head assembly as defined by claim 1 wherein said plurality of photodetector elements are regularly spaced around the peripheral edge of said scatter plate.

3. The sensor head assembly as defined by claim 1 wherein said scatter plate comprises a flat plate of optically transparent material.

4. The sensor head assembly as defined by claim 3 wherein said optically transparent material is quartz.

5. The sensor head assembly as defined by claim 1 wherein said scatter plate comprises a plate of optically transparent material having anti-reflective flat surfaces located in said plane substantially normal to said output beam and including an outer edge, and wherein said plurality of photodetector elements are placed equidistantly from one another around said outer edge.

6. The sensor head assembly as defined by claim 5 wherein said plate of optically transparent material comprises a flat generally rectangular plate of uniform thickness having four corners and with a respective photodetector element of said plurality of photodetector elements being affixed to each of said four corners.

7. The sensor head assembly as defined by claim 1 and additionally including frame means in which said scatter means and said plurality of photodetector elements are mounted; and means for attaching said frame means to said laser for positioning said scatter means in the path of said laser beam.

8. The sensor head assembly as defined by claim 7 wherein said attachment means comprises an elongated bar member adapted to be secured to a laser and additionally including a bracket, including a quick release lever lock mechanism attached to one end of said bar member, and bracket means, including a slot, attached to said housing, said slot being engageable with said lever lock mechanism for slidably positioning said frame means relative to said laser beam.

9. The sensor head assembly as defined by claim 8 wherein said attachment means additionally includes a strap and buckle arrangement for securing said elongated bar member to said laser.

10. The sensor head assembly as defined by claim 3 wherein said optically transparent material is glass.

* * * * *